(12) United States Patent
Christensen et al.

(10) Patent No.: US 7,726,611 B2
(45) Date of Patent: Jun. 1, 2010

(54) ACTIVE RUDDER PEDAL MECHANISM WITH FOREIGN OBJECT STRIKE TOLERANCE AND ARTICULATING BRAKE

(75) Inventors: Donald J. Christensen, Phoenix, AZ (US); Casey Hanlon, Queen Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 891 days.

(21) Appl. No.: 11/585,771

(22) Filed: Oct. 23, 2006

(65) Prior Publication Data

US 2008/0023591 A1   Jan. 31, 2008

Related U.S. Application Data

(60) Provisional application No. 60/818,187, filed on Jun. 30, 2006, provisional application No. 60/818,188, filed on Jun. 30, 2006.

(51) Int. Cl.
*B64C 19/02* (2006.01)
(52) U.S. Cl. .................................. 244/235; 244/87
(58) Field of Classification Search ................ 244/235, 244/87, 234, 88, 184
See application file for complete search history.

(56) References Cited

U.S. PATENT DOCUMENTS

| | | | | |
|---|---|---|---|---|
| 2,424,523 A | * | 7/1947 | Watter | ........................ 244/235 |
| 2,478,546 A | | 8/1949 | Pickens et al. | |
| 2,562,974 A | | 8/1951 | Williams | |
| 2,585,688 A | * | 2/1952 | Saulnier | ...................... 244/235 |
| 2,610,006 A | * | 9/1952 | Boyce | ......................... 244/235 |
| 2,697,566 A | * | 12/1954 | Glass | .......................... 244/222 |
| 3,377,881 A | | 4/1968 | Lucas | |
| 3,919,897 A | | 11/1975 | Yang | |
| 4,192,476 A | | 3/1980 | Byers | |
| 4,198,877 A | | 4/1980 | Huling | |
| 4,470,570 A | * | 9/1984 | Sakurai et al. | ............... 244/235 |
| 4,484,722 A | | 11/1984 | Larson et al. | |
| 4,776,543 A | | 10/1988 | Stableford | |
| 4,848,708 A | | 7/1989 | Farrell et al. | |
| 5,056,742 A | * | 10/1991 | Sakurai | ....................... 244/235 |
| 5,725,184 A | | 3/1998 | Kang et al. | |
| 5,848,558 A | | 12/1998 | Isono et al. | |
| 5,868,359 A | * | 2/1999 | Cartmell et al. | .............. 244/223 |
| 5,924,331 A | | 7/1999 | Pohling | |
| 5,996,439 A | | 12/1999 | Elton et al. | |
| 6,186,025 B1 | | 2/2001 | Engelgau et al. | |
| 6,393,934 B1 | | 5/2002 | Rixon et al. | |

(Continued)

*Primary Examiner*—Christopher P Ellis
(74) *Attorney, Agent, or Firm*—Ingrassia Fisher & Lorenz, P.C.

(57) ABSTRACT

A rudder pedal mechanism is configured with foreign object strike tolerance and/or with an articulating brake. The foreign object strike tolerance is implemented via a force transfer mechanism that is responsive to an input force supplied to the rudder pedal. The force transfer mechanism is configured to supply a transfer force to a rudder position command unit when the input force is supplied in a first direction, and to not supply the transfer force to the rudder position command unit when the input force is supplied in the second direction and exceeds at least a predetermined force magnitude. The articulating brake is implemented via a brake rod assembly that is rotationally coupled to the rudder pedal, and includes a first rod that is rotationally coupled to the rudder pedal, and a second rod that surrounds at least a portion of the first rod.

15 Claims, 10 Drawing Sheets

U.S. PATENT DOCUMENTS

| | | | | |
|---|---|---|---|---|
| 6,923,405 B2 * | 8/2005 | Cline et al. | | 244/99.4 |
| 6,981,409 B2 * | 1/2006 | Huynh | | 73/170.02 |
| 7,059,563 B2 * | 6/2006 | Huynh | | 244/99.5 |
| 2002/0022910 A1 | 2/2002 | Kubica et al. | | |
| 2007/0205333 A1 * | 9/2007 | Boczar et al. | | 244/235 |

* cited by examiner

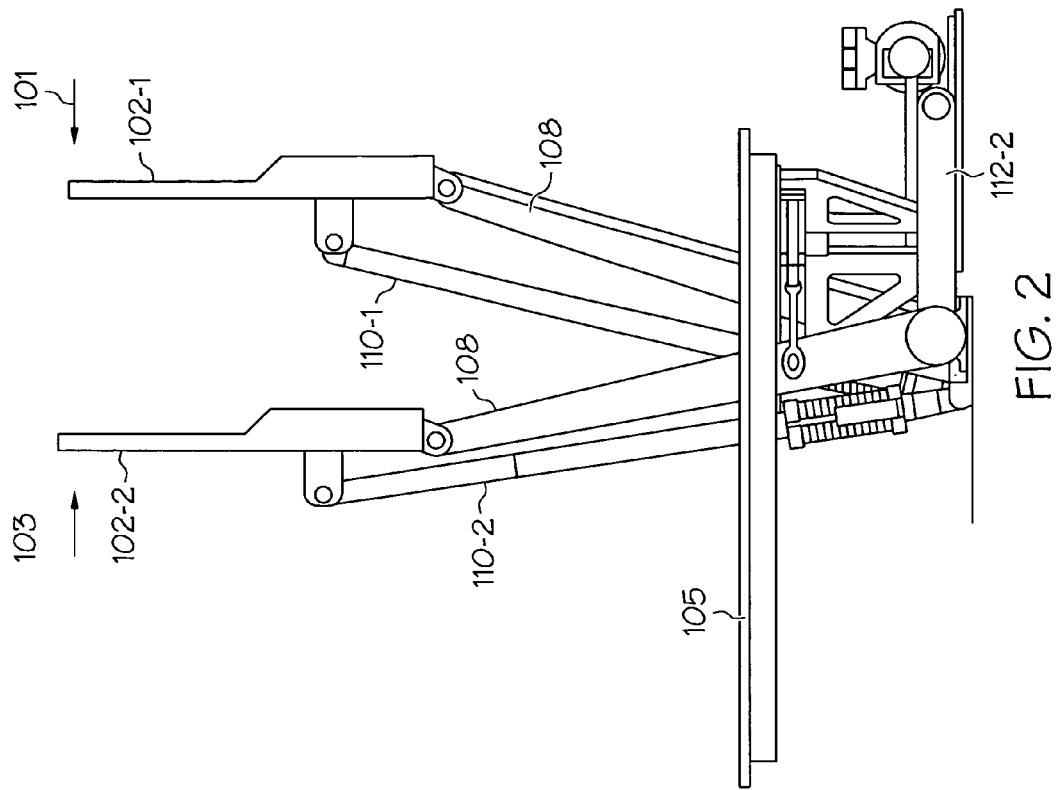
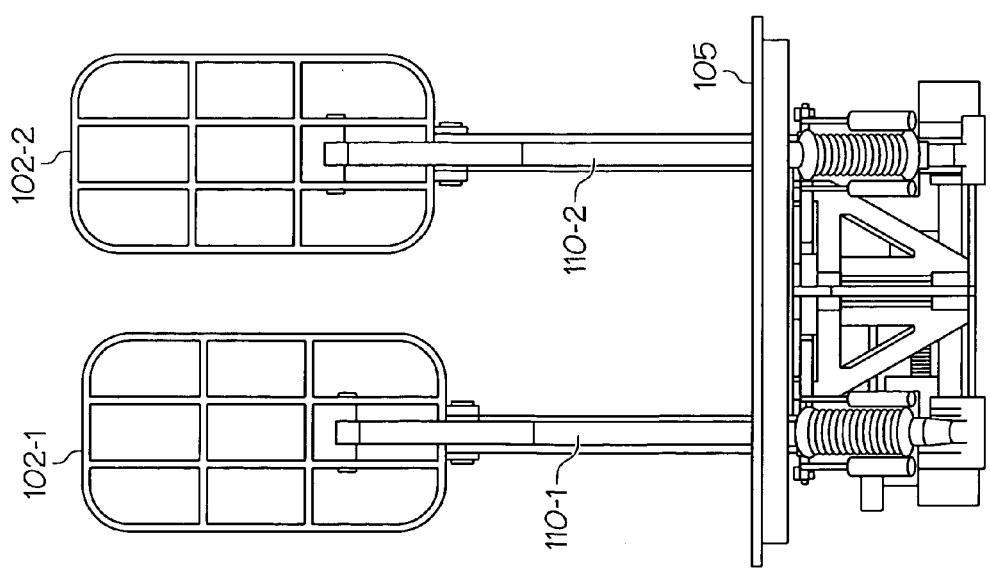

ACTIVE RUDDER PEDAL MECHANISM WITH FOREIGN OBJECT STRIKE TOLERANCE AND ARTICULATING BRAKE

CROSS-REFERENCE TO RELATED APPLICATIONS

This application claims the benefit of U.S. Provisional Application No. 60/818,187, filed Jun. 30, 2006, and U.S. Provisional Application No. 60/818,188, also filed Jun. 30, 2006.

TECHNICAL FIELD

The present invention relates to a rudder pedal mechanism and, more particularly, to an active rudder pedal mechanism with foreign object strike tolerance and an improved brake mechanism.

BACKGROUND

Aircraft typically include a plurality of flight control surfaces that, when controllably positioned, guide the movement of the aircraft from one destination to another. The number and type of flight control surfaces included in an aircraft may vary, but typically include both primary flight control surfaces and secondary flight control surfaces. The primary flight control surfaces are those that are used to control aircraft movement in the pitch, yaw, and roll axes, and the secondary flight control surfaces are those that are used to influence the lift or drag (or both) of the aircraft. Although some aircraft may include additional control surfaces, the primary flight control surfaces typically include a pair of elevators, a rudder, and a pair of ailerons, and the secondary flight control surfaces typically include a plurality of flaps, slats, and spoilers.

The positions of the aircraft flight control surfaces are typically controlled using a flight control surface actuation system. The flight control surface actuation system, in response to position commands that originate from either the flight crew or an aircraft autopilot, moves the aircraft flight control surfaces to the commanded positions. For example, during flight the pilot positions the primary flight control surfaces via a yoke or control stick and a pair of foot pedals. In particular, the pilot may control the position of the elevators, and thus aircraft pitch, by moving the yoke or control stick in a relatively forward or rearward direction. The pilot may control the positions of the ailerons, and thus aircraft roll, by moving (or rotating) the yoke or control stick in the left or right direction (or in the clockwise or counterclockwise direction,). Moreover, the pilot may control the position of the rudder, and thus aircraft yaw, by positioning a pair of right and left rudder pedals using their foot. It is noted that in addition to being used to position the rudder, the rudder pedals may also be used to apply the brakes to the landing gear wheels.

The rudder pedals are typically positioned in the aircraft and may be coupled to a system of mechanical mechanisms, such as rods and linkages, that are used to convert rudder pedal movements into rudder movement commands. These mechanical mechanisms are typically disposed below the aircraft cabin floor, and near the nose of the aircraft. Due in part to this location, the mechanical mechanisms are typically designed to withstand being struck by an object. For example, although highly unlikely, it is postulated that a bird (or other foreign object) could strike and penetrate the nose of the aircraft, and cause an inadvertent movement of the rudder pedals and/or rudder pedal mechanisms.

Presently, many aircraft address the postulated object strike event by incorporating break-away links within the mechanical mechanisms. These break-away links are normally in tension during operation. However, if the mechanical mechanisms are struck by an object and experience a compressive force, the links give way and do not, therefore, transmit a command to the rudder.

Although the present devices and methods for rudder pedals and associated mechanical mechanisms are generally safe, reliable, and robust, they do suffer certain drawbacks. For example, present devices may not be useful in current fly-by-wire flight control systems. Moreover, present mechanisms are configured such that brake operation may be undesirably influenced during rudder pedal operation.

Hence, there is a need for a rudder pedal mechanism that is configured to exhibit foreign object strike tolerance and that is useful in current fly-by-wire flight control systems and/or that allows for appropriate rudder control via the pedals without influencing brake operation, and vice-versa. The present invention addresses at least these needs.

BRIEF SUMMARY

The present invention provides a rudder pedal mechanism that is configured to exhibit foreign object strike tolerance and/or that allows for appropriate rudder control via the pedals without influencing brake operation, and vice-versa.

In one embodiment, and by way of example only, a rudder pedal mechanism includes a rudder pedal, a rudder position command unit, and a force transfer mechanism. The rudder pedal is configured to receive an input force in at least a first direction and a second direction and, in response to the input force, to move in at least a first direction and a second direction, respectively. The rudder position command unit is configured to receive a transfer force representative of a rudder command and is operable, upon receipt of the force, to move to a position and supply a rudder position command signal. The force transfer mechanism is coupled to the rudder pedal and the rudder position command unit. The force transfer mechanism is responsive to the input force supplied to the rudder pedal to supply the transfer force to the rudder position command unit when the input force is supplied in the first direction, and not supply the transfer force to the rudder position command unit when the input force is supplied in the second direction and exceeds at least a first predetermined magnitude.

In another exemplary embodiment, a rudder pedal mechanism includes a mount structure, a rudder pedal, a pedal arm, and a brake rod assembly. The pedal arm is rotationally coupled to the mount structure and the rudder pedal. The brake rod assembly is rotationally coupled to the mount structure and the rudder pedal, and includes a first rod and a second rod. The first rod has a first end and a second end. The first rod first end is rotationally coupled to the rudder pedal. The second rod has a first end and a second end. The second rod first end surrounds at least a portion of the first rod, and the second rod second end is rotationally coupled to the mount structure.

BRIEF DESCRIPTION OF THE DRAWINGS

FIGS. 1-4 are front, side, bottom, and top views, respectively, of an active rudder pedal system according to an exemplary embodiment of the present invention;

DETAILED DESCRIPTION OF A PREFERRED EMBODIMENT

Figure 4:
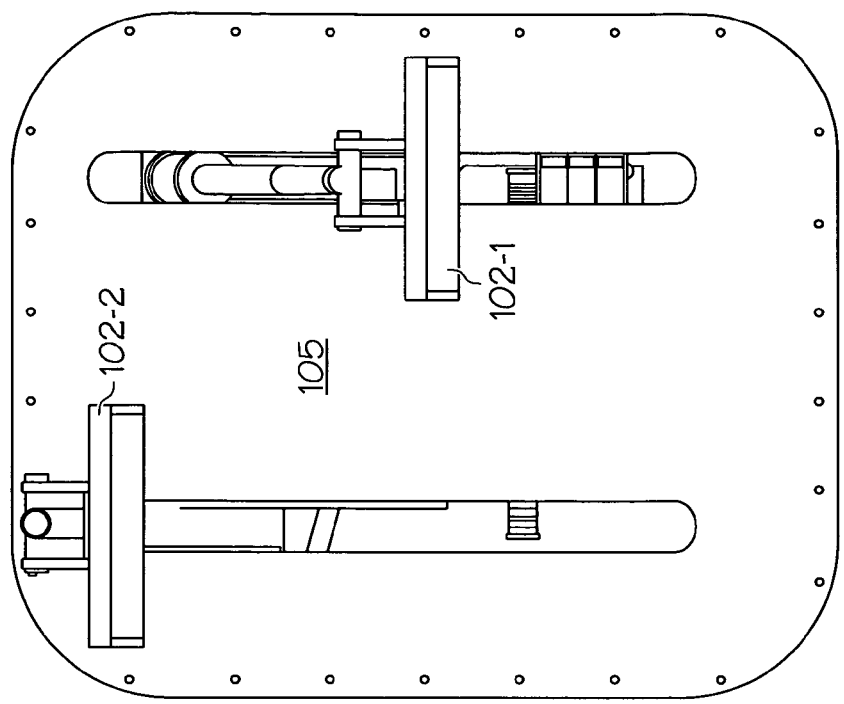
Figure 3:
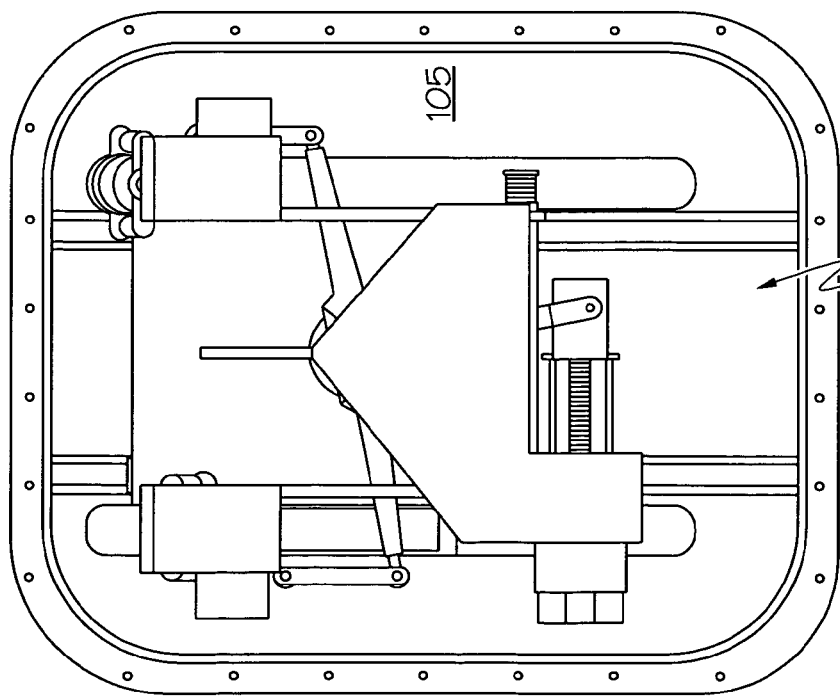
Figure 5:
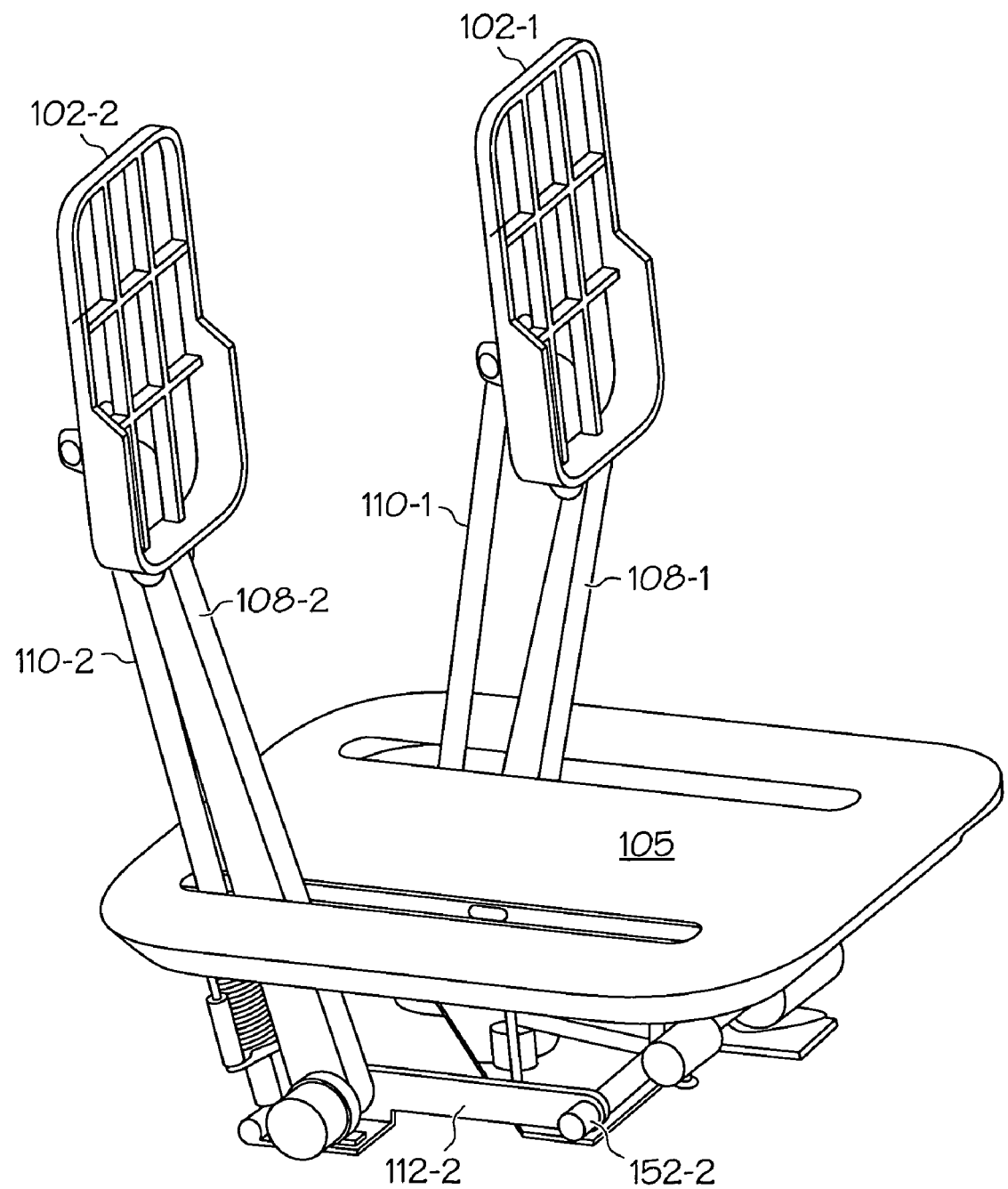
FIGS. 5 and 6 are perspective views from above and beneath, respectively, the exemplary rudder pedal system of FIGS. 1-4.
Figure 6:
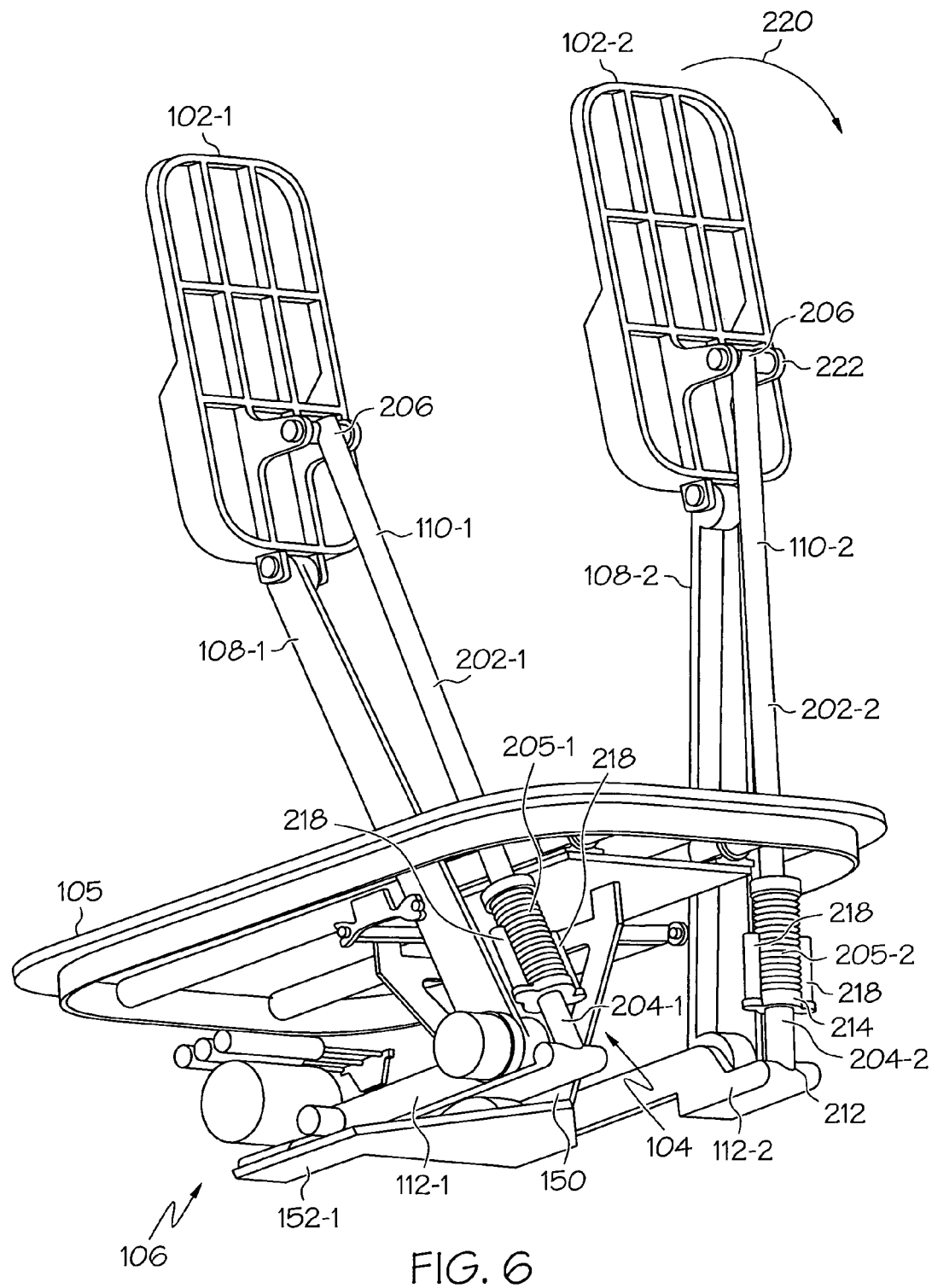
Figure 7:
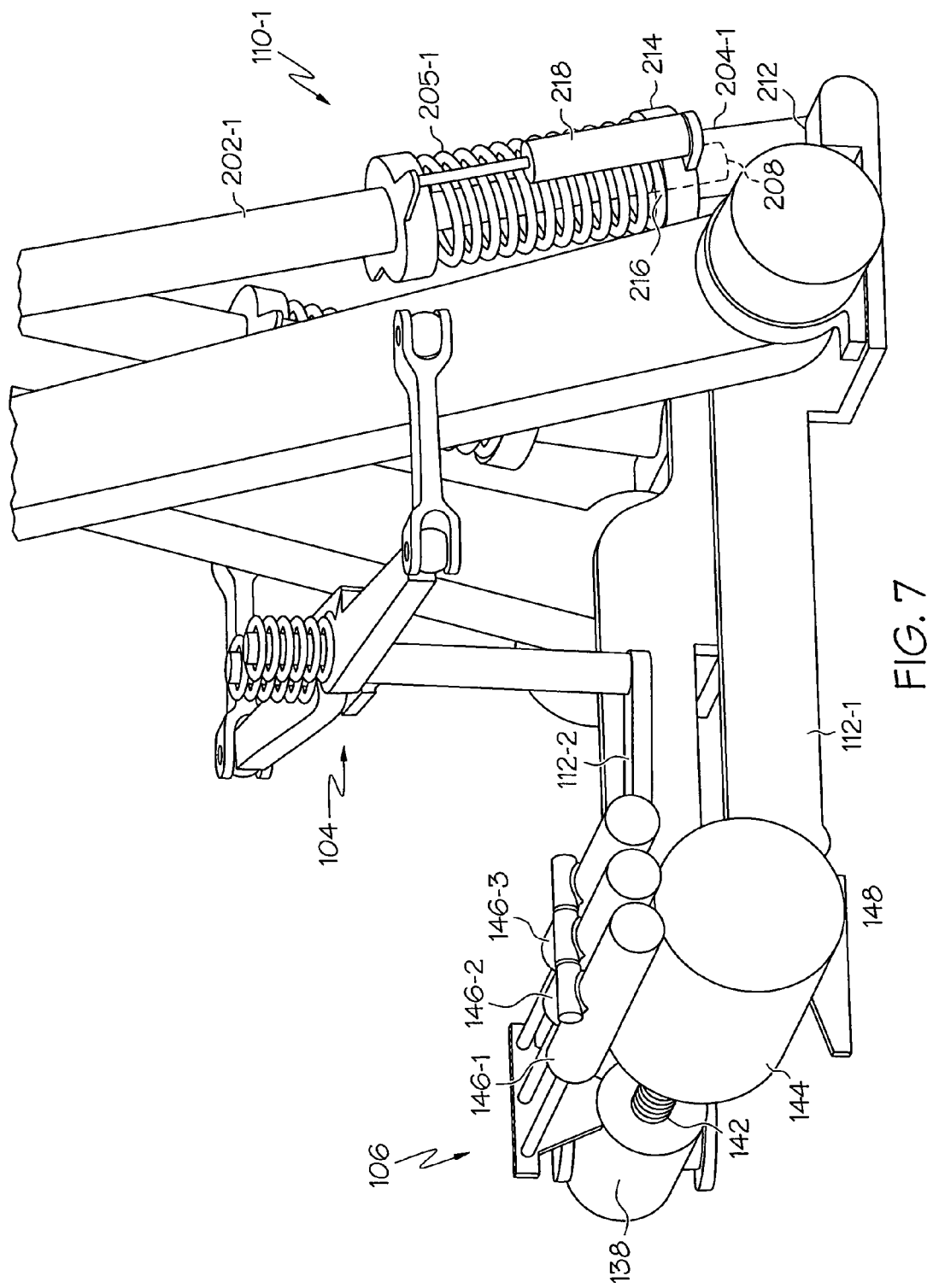
FIG. 7 is a close-up perspective view of a portion of the exemplary rudder pedal system of FIGS. 1-4.
Figure 8:
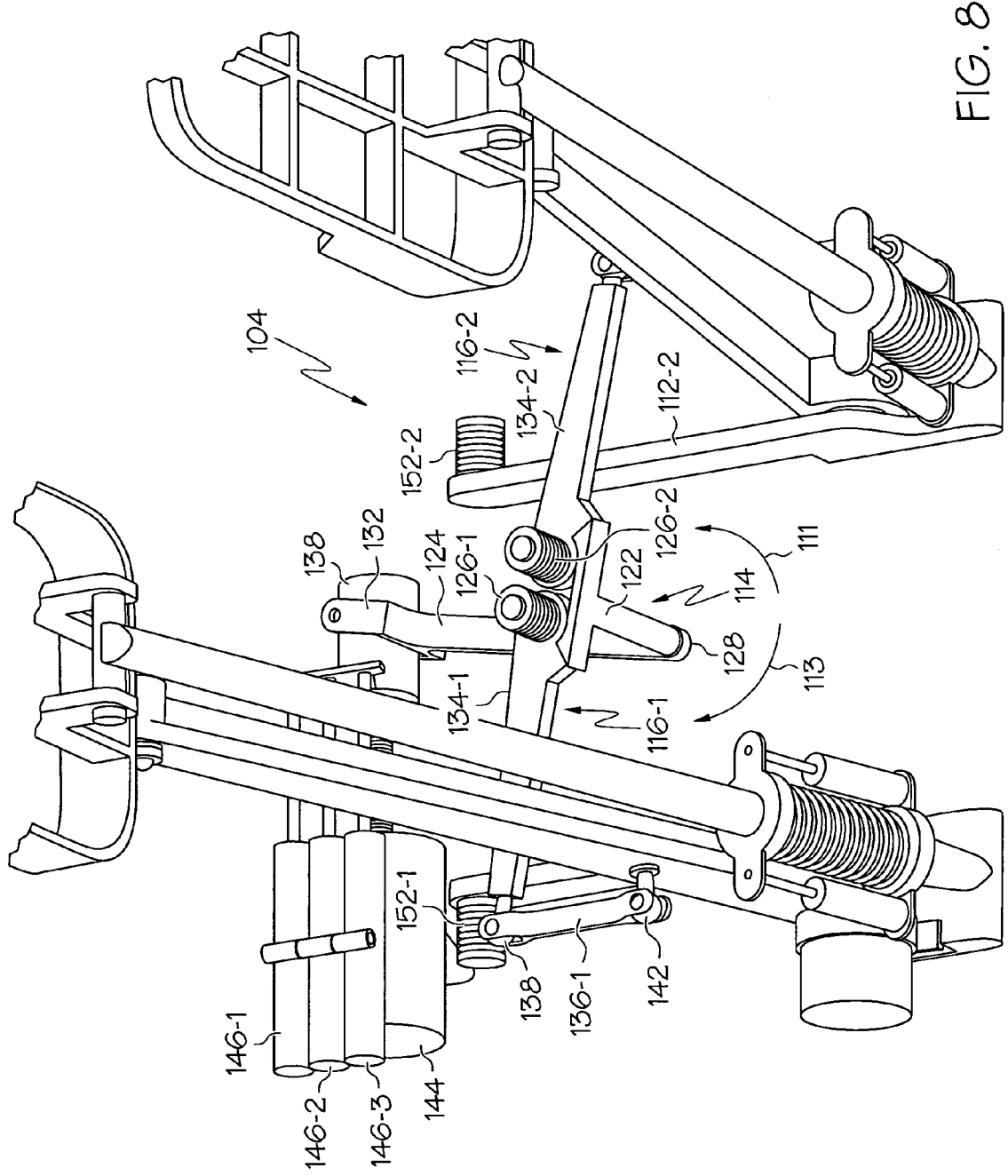
FIGS. 8-13 are various perspective views of various portions the exemplary rudder pedal system of FIGS. 1-4.
Figure 9:
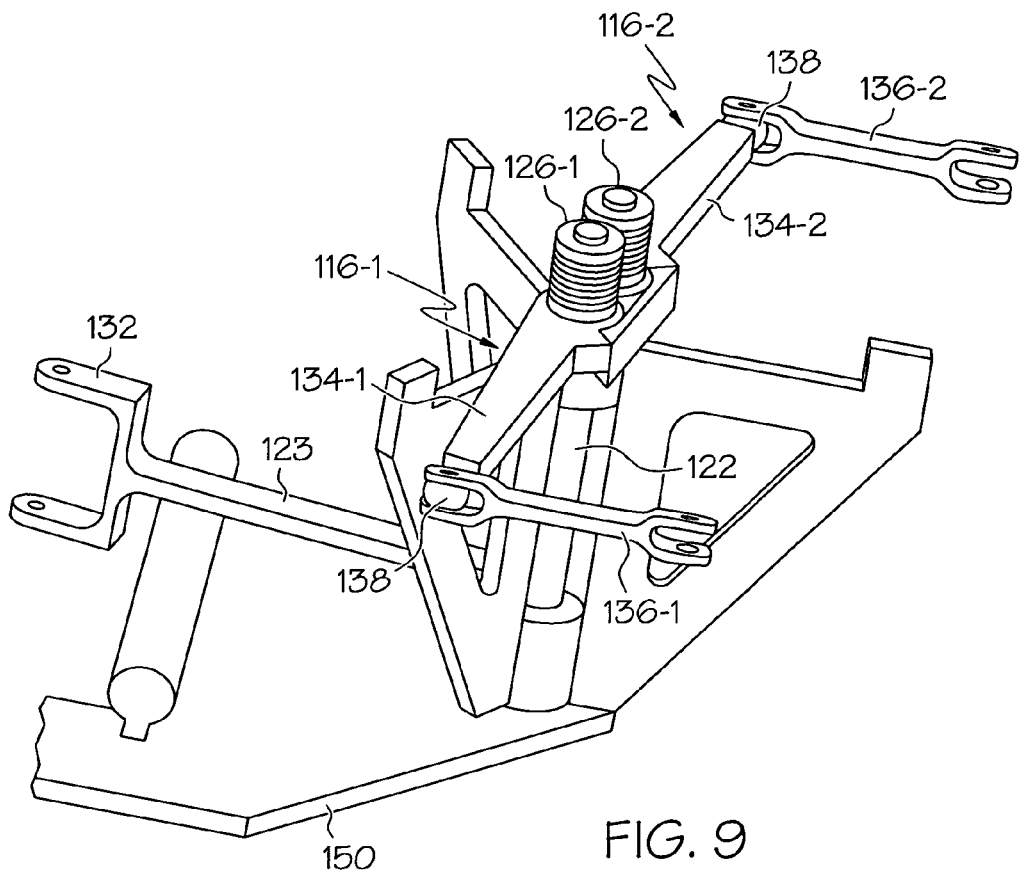
Figure 10:
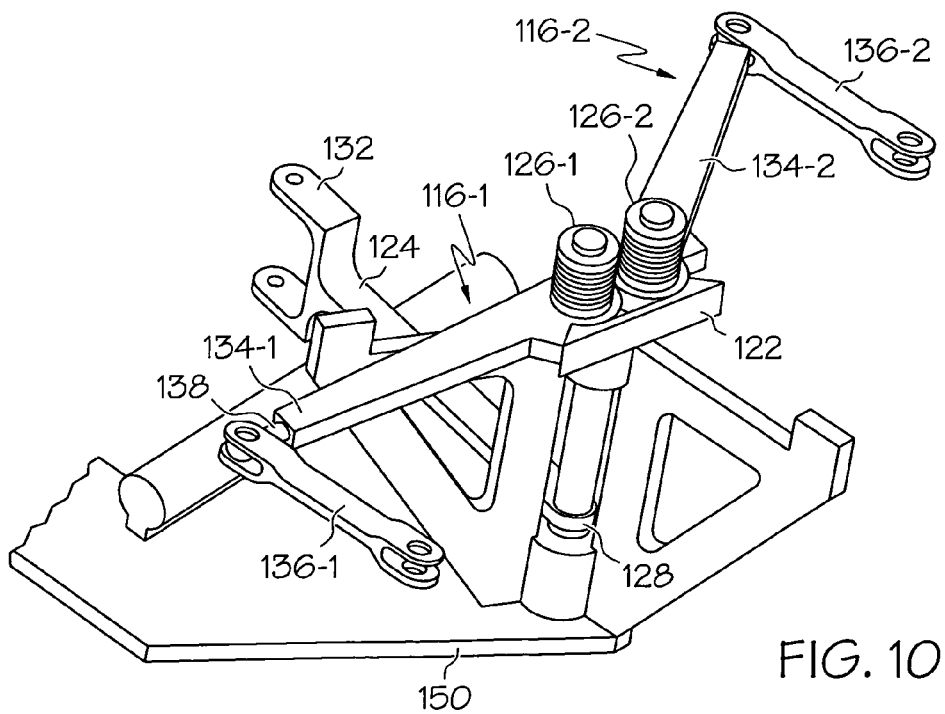
Figure 11:
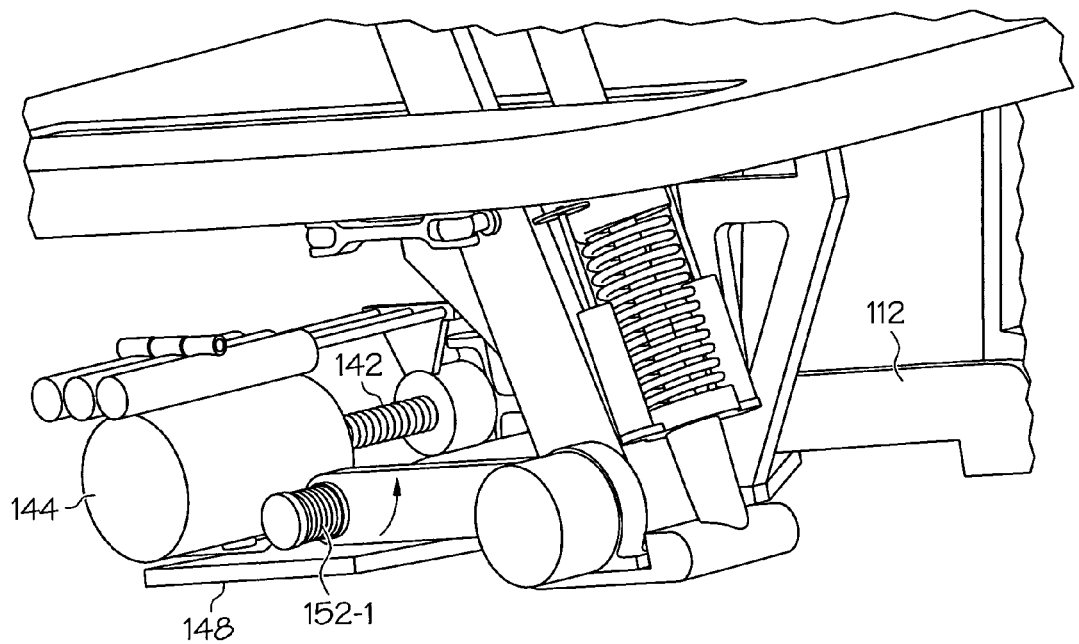
Figure 12:
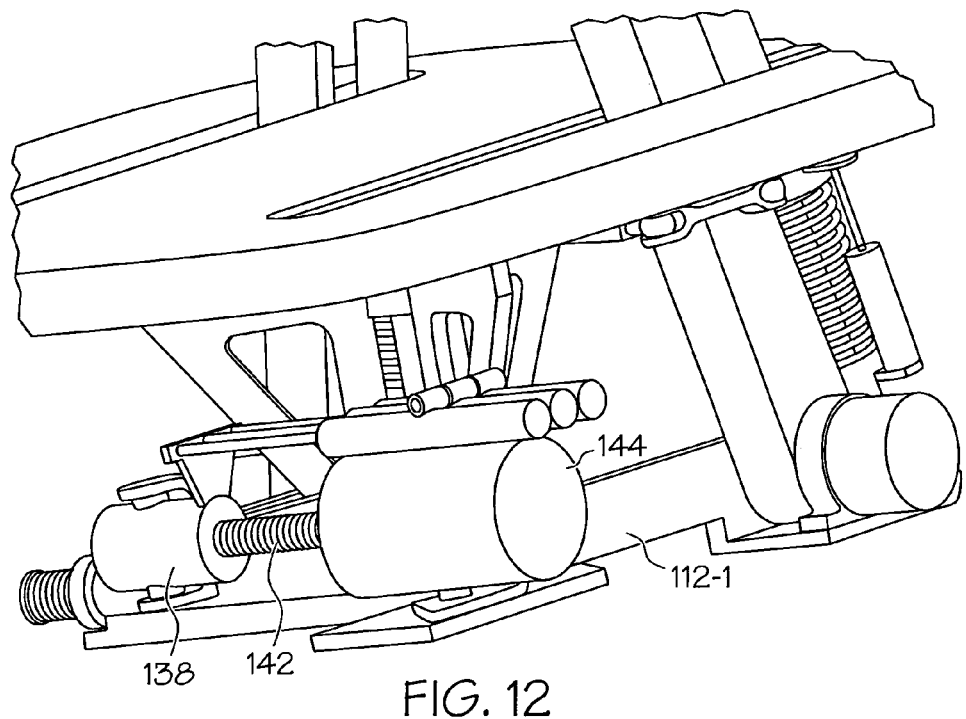
Figure 13:
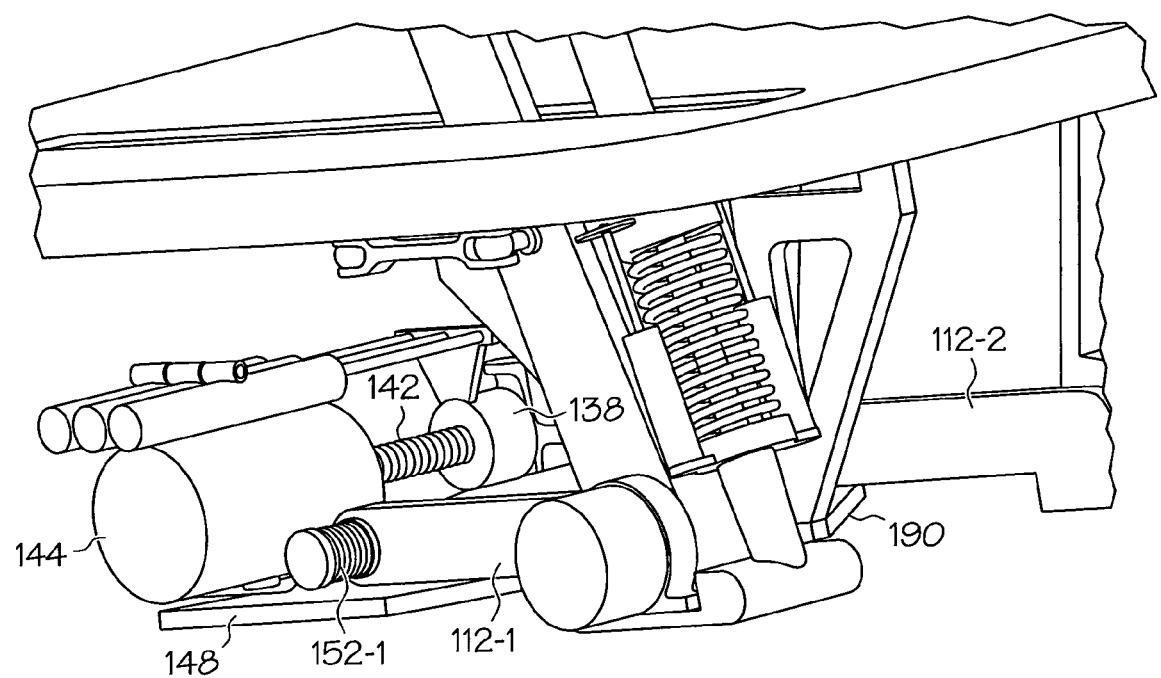

The following detailed description is merely exemplary in nature and is not intended to limit the invention or the application and uses of the invention. Furthermore, there is no intention to be bound by any theory presented in the preceding background or the following detailed description.

FIGS. 1-14 are various views of an exemplary embodiment of an active rudder pedal system 100. The system includes a pair of rudder pedals 102 (102-1, 102-2), a force transfer mechanism 104, and a rudder position command unit 106. The rudder pedals 102 are each configured to extend through a cockpit floor board 105, and to receive an input force from, for example, a pilot's foot and, in response to the received force, to move. The rudder pedals 102 are each coupled to the force transfer mechanism 104, which is in turn coupled to the rudder position command unit 106. In the depicted embodiment, the rudder pedals 102 are coupled to the force transfer mechanism 104 via a pair of pedal arms 108. In particular, at least in the depicted embodiment, the rudder pedals 102 are each rotationally coupled to one of the pedal arms 108, and to a brake rod assembly 110. The pedal arms 108 are in turn each rotationally coupled to a pivot arm 112, which are described further below, and to the force transfer mechanism 104.

The force transfer mechanism 104 is configured to selectively transfer the input force supplied to the rudder pedals 102 to the rudder position command unit 106. In particular, the force transfer mechanism 104 is configured to transfer the input force to the rudder position command unit 106 if the input force is in at least a first direction, and to not transfer the input force to the rudder position command unit 106 if the input force is in at least a second direction and exceeds at least a first predetermined magnitude. A particular preferred configuration for carrying out this functionality is described further below. Before doing so, however, the rudder position command unit 106 will be briefly described.

The rudder position command unit 106 is coupled to the force transfer mechanism 104 and receives the input force that the force transfer mechanism 104 selectively transfers. When the force transfer mechanism 104 transfers the input force to the rudder position command unit 106, the rudder position command unit 106 moves to a position and supplies a rudder position command signal. The rudder position command signal 106 is supplied to, for example, a non-illustrated flight control computer, a non-illustrated actuator controller, or other suitable device, which in turn supplies a suitable command that ultimately causes the aircraft rudder to move to the position commanded by the pilot.

Although the rudder position command unit 106 may be implemented in accordance with any one of numerous configurations, in the depicted embodiment it includes a ball nut 138, a ball screw 142, a motor 144, and a plurality of position sensors 146. The ball nut 138 is mounted on the ballscrew 142, and is coupled to each of the position sensors 146. The ball screw 142 is coupled to the motor 144 and receives a drive force from the motor 144 when the motor 144 is energized. The ball nut 138 is coupled against rotation to the force transfer mechanism 104. However, upon receipt of an input force from the force transfer mechanism 104, the ball nut 138 will translate, and cause the ball screw 142 to rotate.

Translation of the ball nut 138 is sensed by the positions sensors 146, which supply the rudder position command signal. In the depicted embodiment, three position sensors 146-1, 146-2, 146-3 are included to provide redundancy. It will be appreciated, however, that more or less than this number could be included. Moreover, in the depicted embodiment the position sensors 146 are implemented using LVDT (linear variable differential transformer) type sensors. It will additionally be appreciated that any one of numerous other sensors could also be used. For example, the sensors 146 could alternatively be implemented using RVDT (rotary variable differential transformer) type sensors.

It will be appreciated that the motor 144 is selectively energized to provide tactile or haptic feedback to the pilot. In particular, the motor 144 is selectively energized to supply a rotational drive force to the ball screw 142 in a direction opposite that which the ball screw 142 is being rotated as a result of ball nut 138 translation. The magnitude of the force supplied from the motor 144 to the ball screw 142 will preferably vary depending on flight conditions, actual rudder position, etc. It will additionally be appreciated that at least the motor 144 is rotationally mounted on a frame 148.

Returning now to a description of the force transfer mechanism 104, in the depicted embodiment it includes a bell crank 114, and a pair of break-away link assemblies 116. The bell crank 114 is rotationally mounted on a frame 150, which may be the same frame 148 that the motor 144 is rotationally mounted to, and is coupled to the command unit 106. More specifically, in at least the depicted embodiment, the bell crank 114 includes an input section 122 and an output section 124. The input section 122 is rotationally coupled to each of the break-away link assemblies 116, via a pair of break-away link torsion springs 126, and is rotationally mounted on the frame 150. The output section 124 is disposed substantially perpendicular to the input section 122, and has a first end 128 that is coupled to, and rotates with, the input section 122, and a second end 132 that is coupled to the rudder position command unit 106. Thus, rotation of the input section 122 in either a first rotational direction 111 or a second rotational direction 113 (see FIG. 8) causes the output section 124 to concomitantly rotate in the first rotational direction 111 or the second rotational direction 113, respectively.

The break-away link assemblies 116 are each coupled to the bell crank 114 and to one of the pedal arms 108. The break-away link assemblies 116 each include a break-away link 134 and a pedal arm link 136. The break-away links 134 are each rotationally coupled to the bell crank input section 122 via one of the break-away link torsion springs 126, and are pivotally coupled, preferably via a suitably configured rod end 138, to one of the pedal arm links 136. The pedal arm links 136 are in turn pivotally coupled, also preferably via a suitable rod end 142, to one of the pedal arms 108.

The break-away link torsion springs 126 each supply a bias torque to its associated break-away link 134 that urges the break-away link 134 to rotate toward its associated pedal arm 104, which in the depicted embodiment urges the break-away link 134 into engagement with the bell crank input section 122. Thus, when the pilot supplies an input force to the right-foot rudder pedal 102-1 in the first direction 101 (see FIG. 2) that exceeds any force that may be simultaneously supplied to the left-foot rudder pedal 102-2 in the first direction 101, the supplied force is transferred, via the associated pedal arm 108-1, to the pedal arm link 136-1. As a result, the pedal arm link 136-1 is placed in tension, and transfers the force to the associated break-away link 134-1. Because the associated break-away link 134-1 is urged, via its break-away link torsion spring 126-1, into engagement with the bell crank input section 122, it causes the bell crank 114 to rotate in the first direction 111, and supply a transfer force to the rudder position command unit 106.

As the bell crank 114 rotates it supplies a force that urges the other break-away link 134-2 to rotate in the first direction. As a result, its associated pedal arm link 136-2 is placed in tension and supplies a force to the left-foot rudder pedal 102-2 that causes the left-foot rudder pedal 102-2 to move in the second direction 103 (see FIG. 2). It will be understood that the system 100 operates substantially identically when a force is supplied to the left-foot rudder pedal 102-2 in the first direction 101 that exceeds any force that may be simultaneously supplied to the right-foot rudder pedal 102-1 in the first direction 101.

From the above-described description of the force transfer mechanism 104, it will additionally be appreciated that if either or both of the rudder pedals 102 and/or pedal arms 108 is supplied with a force in the second direction 103, the force will be transferred to the associated pedal arm link 136 (or links), placing the pedal arm link 136 (or links) in compression. If the compressive force exceeds a predetermined magnitude, which is preferably established by the associated break-away link torsion springs 126, the associated break-away link 134 (or links) rotates away from the bell crank input section 122. Thus, this rotation of the break-away link 134 (or links) does not result in a concomitant rotation of the bell crank 114, and the rudder position command signal supplied from the rudder position command unit 106 is unchanged as a result of this rudder pedal motion. It will be appreciated that a force may be supplied to the rudder pedals 102 and/or pedal arms 108 in the highly unlikely event of an unintentional strike by an object that, for example, strikes and then penetrates the aircraft fuselage. For example, it is postulated that a bird could unintentionally cause such an event.

As was previously noted, the pedal arms 108 are each coupled to a pivot arm 112. The pivot arms 112 are each rotationally coupled, via a pivot arm torsion spring 152, to the frame 150. The pivot arm torsion springs 152 each supply a bias torque to its associated pivot arm 112 that urges the pivot arm 112 toward the frame 150. With this configuration if one or both of the pivot arms 112 is subjected to an unintentional force that urges the pivot arm 112 in a direction away from the frame, the pivot arm 112 will rotate against the bias torque of the pivot arm torsion spring 152 and then return to its position when the unintentional force is no longer present.

Figure 14:
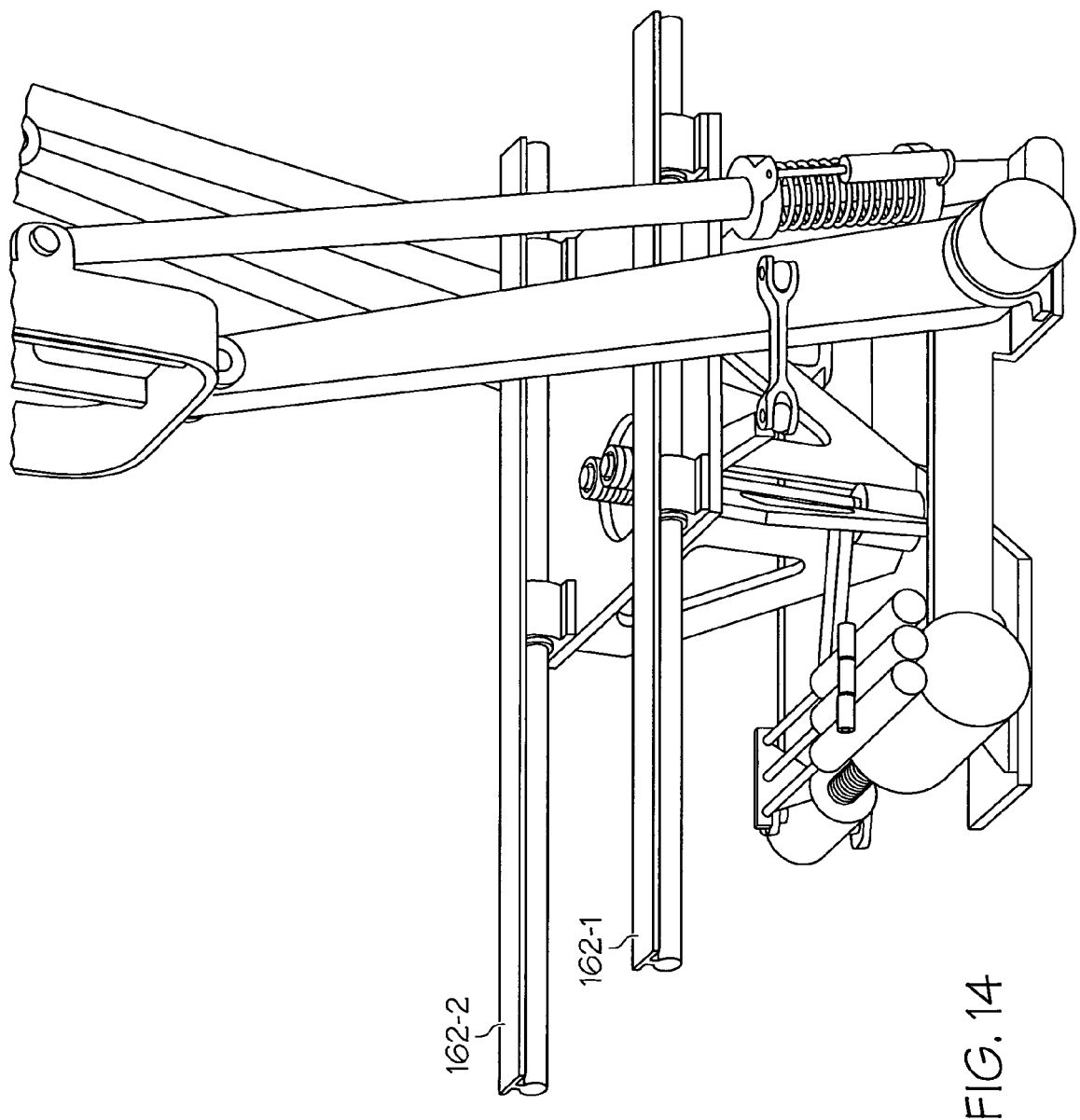
FIG. 14 is another perspective view of the exemplary rudder pedal system of FIGS. 1-4, depicting rails upon which the rudder pedal system may slide.

The frame 150, as shown in the FIG. 14, may be configured to slide on rails 162. This configuration allows the rudder pedal system 100 to be adjusted for different pilots.

As was also previously noted, the rudder pedals 102, in addition to being rotationally coupled to one of the pedal arms 108, are each rotationally coupled to a brake rod assembly 110. Each brake rod assembly 110 is in turn rotationally coupled to the frame 150. In particular, and as shown most clearly in FIGS. 6 and 7, each brake rod assembly 110 includes a first rod 202, a second rod 204, and a spring 205. The first rods 202 each include a first end 206 and a second end 208 (shown in phantom in FIG. 7). The first rod first ends 206 are rotationally coupled to its associated brake pedal 102. The first rod second ends 208 are each disposed within the associated second rod 204, and are configured to move therein.

The second rods 204, similar to the first rods 202, each include a first end 212 and a second end 214. The second rod second ends 214 each have an opening 216 formed therein, into and through which the associated first rod second ends 208 extend. Thus, the second rods 204 surround at least the associated first rod second end 208. The second rod first ends 212 are rotationally mounted on the frame 150.

Each spring 205 is coupled between an associated first rod 202 and an associated second rod 204, and is configured to supply a bias force that urges the two rods 202, 204 away from one another. As FIGS. 6 and 7 also show, a pair of position sensors 218 are coupled between each set of first 202 and second 204 rods. The position sensors 218 are configured to sense the position of the first rod 202 relative to the second rod 204 and supply a brake signal representative thereof. The brake signal is ultimately supplied to another system that uses it to actuate the aircraft brakes on the appropriate aircraft wheel or wheels. Although two position sensors 218 are associated with each brake rod assembly 110 for redundancy, more or less than this number could be used. Moreover, in the depicted embodiment the position sensors 218 are each implemented using LVDT (linear variable differential transformer) type sensors. It will additionally be appreciated that any one of numerous other sensors could also be used. For example, the position sensors 218 could alternatively be RVDT type sensors.

With the above-described brake rod assembly 110 configuration, when a force is supplied to the rudder pedals 102 in the first direction 101, the first 202 and second 204 rods will rotate, but not translate relative to one another. However, if a pilot supplies a rotational force to the rudder pedals 102 that causes the rudder pedals 102 to rotate toward a forward direction 220 (see FIG. 6), and is sufficient to overcome the bias force of the spring 205, the first 202 and second 204 rods will translate relative to one another. In particular, the first rod 202 will translate downwardly toward the second rod 204. Thus, the second rod 202 will surround a greater portion of the first rod 202. The movement of the first rod 202 toward the second rod 204 is sensed by the associated position sensors 218 and, as was noted above, the position sensors 218 supply appropriate brake signals. As the pilot reduces the rotational force supplied to the rudder pedal 102 (or pedals), the spring 205 biases the appropriate first rod 202 away from the second rod 204, until it attains its static position.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A rudder pedal mechanism, comprising:
   a rudder pedal configured to receive an input force in at least a first direction and a second direction and, in response to the input force, to move in at least a first direction and a second direction, respectively;
   a rudder position command unit configured to receive a transfer force representative of a rudder command and operable, upon receipt of the transfer force, to move to a position and supply a rudder position command signal;
   a force transfer mechanism coupled to the rudder pedal and the rudder position command unit, the force transfer mechanism responsive to the input force supplied to the rudder pedal to (i) supply the transfer force to the rudder position command unit when the input force is supplied in the first direction and (ii) not supply the transfer force to the rudder position command unit when the input force is supplied in the second direction and exceeds at least a predetermined force magnitude.

2. The mechanism of claim 1, wherein the force transfer mechanism comprises:
   a bell crank coupled to the rudder position command unit and configured, upon receipt of a rotational drive force, to selectively supply the transfer force to the rudder position command unit;
   a break-away link assembly coupled to the bell crank and the rudder pedal, the break away link responsive to the input force to (i) supply the rotational drive force to the bell crank when the input force is supplied in the first direction and (ii) not supply the rotational drive force to the bell crank when the input force is supplied in the second direction and exceeds at least the predetermined force magnitude.

3. The mechanism of claim 2, wherein the force transfer mechanism further comprises:
   a torsion spring coupled to the break-away link, the torsion spring configured to supply a bias force to the break-away link that urges the break-away link into engagement with the bell crank, the bias force having a magnitude that establishes the predetermined force magnitude.

4. The mechanism of claim 2, wherein the bell crank comprises:
   an input section rotationally coupled to the break-away link; and
   an output section coupled to the input section and the rudder position command unit.

5. The mechanism of claim 2, wherein the break-away link assembly comprises:
   a pedal arm link coupled to the rudder pedal; and
   a break-away link rotationally coupled to the pedal arm link and the bell crank.

6. The mechanism of claim 1, wherein the rudder position command unit comprises:
   a rotationally mounted ball screw;
   a ball nut rotationally mounted on the ball screw and coupled to receive the transfer force selectively supplied from the force transfer mechanism, the ball nut configured, upon receipt of the transfer force, to translate on the ball screw to a position; and
   a position sensor coupled to, and configured to sense the position of, the ball nut, the position sensor further configured to supply a position signal representative of ball nut position.

7. The mechanism of claim 6, wherein the position sensor comprises a variable differential transformer.

8. The mechanism of claim 6, wherein the rudder position command unit further comprises:
   a motor coupled to the ball screw and adapted to be selectively energized, the motor configured, upon being energized, to supply a drive force to the ball screw.

9. The mechanism of claim 8, wherein:
   translation of the ball nut cause rotation of the ball screw; and
   the motor is selectively energized to supply a rotational drive force to the ball screw in a direction opposite that which the ball nut causes the ball screw to rotate.

10. The mechanism of claim 1, further comprising:
    a second rudder pedal coupled to the force transfer mechanism, the second rudder pedal configured to receive a second input force in at least the first direction and the second direction and, in response to the input force, to move in at least the first direction and the second direction, respectively.

11. The mechanism of claim 1, further comprising:
    a mount structure;
    a pedal arm coupled between the rudder pedal and the force transfer mechanism;
    a pivot arm rotationally coupled between the pedal arm and the frame; and
    a pivot arm torsion spring coupled to the pivot arm, the pivot arm torsion spring configured to supply a bias torque to the pivot arm that urges the pivot arm toward the mount structure.

12. The mechanism of claim 1, further comprising:
    a mount structure;
    a pedal arm rotationally coupled to the mount structure and the rudder pedal;
    a brake rod assembly rotationally coupled to the mount structure and the rudder pedal, the brake rod assembly including:
       a first rod having a first end and a second end, the first rod first end rotationally coupled to the rudder pedal, and
       a second rod having a first end and a second end, the second rod first end surrounding at least a portion of the first rod, the second rod second end rotationally coupled to the mount structure.

13. The mechanism of claim 12, further comprising:
    a second rudder pedal coupled to the force transfer mechanism, the second rudder pedal configured to receive a second input force in at least the first direction and the second direction and, in response to the input force, to move in at least the first direction and the second direction, respectively;
    a second a pedal arm rotationally coupled to the mount structure and the second rudder pedal;
    a second brake rod assembly rotationally coupled to the mount structure and the second rudder pedal, the second brake rod assembly including:
       a third rod having a first end and a second end, the third rod first end rotationally coupled to the second rudder pedal, and
       a fourth rod having a first end and a second end, the fourth rod first end surrounding at least a portion of the third rod, the fourth rod second end rotationally coupled to the mount structure.

14. The mechanism of claim 13, further comprising:
    a first position sensor configured to (i) sense a relative position between the first and second rods and (ii) supply a brake signal representative thereof; and
    a second position sensor configured to (i) sense a relative position between the third and fourth rods and (ii) supply a brake signal representative thereof.

15. The mechanism of claim 13, further comprising:
    a first spring coupled between the first rod and the second rod and configured to be compressed when the first rod is moved into the second rod; and
    a second spring coupled between the third rod and the fourth rod and configured to be compressed when the first rod is moved into the second rod.

* * * * *